US010131297B1

(12) United States Patent
Kakimi et al.

(10) Patent No.: US 10,131,297 B1
(45) Date of Patent: Nov. 20, 2018

(54) ELECTRIC CONNECTION BOX AND WIRE HARNESS

(71) Applicant: Yazaki Corporation, Toyko (JP)

(72) Inventors: Takaaki Kakimi, Shizuoka (JP); Tatsuhiko Ikeda, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/956,326

(22) Filed: Apr. 18, 2018

(30) Foreign Application Priority Data

Apr. 27, 2017 (JP) .................................. 2017-087968

(51) Int. Cl.
| | | |
|---|---|---|
| *B60R 16/023* | (2006.01) | |
| *B60R 16/02* | (2006.01) | |
| *H02G 3/08* | (2006.01) | |

(52) U.S. Cl.
CPC ...... *B60R 16/0238* (2013.01); *B60R 16/0207* (2013.01); *H02G 3/088* (2013.01)

(58) Field of Classification Search
CPC ........ H02G 3/08; B60R 16/0239; H05K 5/00; H05K 5/02; H05K 5/0026; H01R 12/716; H01R 12/724; H01R 13/5213
USPC ............................ 174/50, 520; 439/76.1, 0.2
See application file for complete search history.

(56) References Cited

U.S. PATENT DOCUMENTS

| | | | |
|---|---|---|---|
| 6,541,700 B2 * | 4/2003 | Chiriku ............... | B60R 16/0238 174/50 |
| 7,611,360 B2 * | 11/2009 | Akahori ................ | H01R 4/185 439/76.2 |
| 8,420,931 B2 * | 4/2013 | Soh ..................... | B60R 16/0238 174/17 R |
| 9,231,330 B2 * | 1/2016 | Tashiro ............... | B60R 16/0238 |
| 10,063,041 B2 * | 8/2018 | Maebashi ........... | B60R 16/0238 |
| 2013/0316550 A1 | 11/2013 | Makino et al. | |

FOREIGN PATENT DOCUMENTS

| | | |
|---|---|---|
| JP | 2010-041778 A | 2/2010 |
| JP | 2014-003880 A | 1/2014 |

* cited by examiner

*Primary Examiner* — Hien Vu (74) *Attorney, Agent, or Firm* — Sughrue Mion, PLLC (57) ABSTRACT

In an electric connection box and a wire harness, a side cover is attached to an outer peripheral surface of a housing, and the housing and the side cover form a side space portion. An electric wire extends from an internal space portion to the side space portion and is routed to the outside of the housing through the side space portion. In the electric wire, an electric wire main body is formed along an inclined direction of an inclined wall of the side cover. A regulating portion is formed along the inclined direction of the inclined wall in the housing in the side space portion. A gap between the electric wire and the housing is filled with the regulating portion. In the side space portion, the electric wire main body is positioned between the inclined wall of the side cover and the regulating portion.

2 Claims, 4 Drawing Sheets

ELECTRIC CONNECTION BOX AND WIRE HARNESS

CROSS-REFERENCE TO RELATED APPLICATION(S)

The present application claims priority to and incorporates by reference the entire contents of Japanese Patent Application No. 2017-087968 filed in Japan on Apr. 27, 2017.

BACKGROUND OF THE INVENTION

1. Field of the Invention

The present invention relates to an electric connection box and a wire harness.

2. Description of the Related Art

There is an electric connection box (also referred to as junction box, fuse box, relay box, and the like) which is mounted on a vehicle body and collectively houses various electric components and electric component modules such as a component for connection processing such as a wire harness and an electric component such as a fuse, a relay, an electronic control unit in an internal space portion. The electric connection box is provided in a space such as an engine room of the vehicle body, for example (Japanese Patent Application Laid-open No. 2014-3880, Japanese Patent Application Laid-open No. 2010-41778).

Some of the electric connection boxes have an electric wire to supply power from the outside of a housing to the electric components housed in the internal space portion and a stud bolt. The stud bolt is provided in the internal space portion and is electrically connected to the electric components housed in the internal space portion. A terminal having a through-hole is crimped to at least one end portion of the electric wire. The electric wire is fastened to the stud bolt by making the stud bolt pass through the through-hole of the terminal and screwing a nut to the stud bolt. That is, in the electric connection box, the electric wire supplies power from the outside of the housing to the electric components in the internal space portion via the stud bolt.

In the electric connection box, a side cover is attached adjacent to a position in an outer peripheral surface of the housing where the stud bolt is provided, and a side space portion is formed by the housing and the side cover. The side space portion communicates with the outside of the housing through an opening formed in a lower side end portion. Accordingly, the electric wire extends from the internal space portion where the stud bolt is provided to the side space portion on the outer peripheral side of the housing, passes through the side space portion, and is routed to the outside of the housing through the opening.

The electric connection box is attached at a position adjacent to a member on the vehicle body side when being attached to the vehicle body side. Therefore, the electric connection box is attached to the vehicle body side in a state where the electric wire avoids the member on the vehicle body side. Therefore, the electric wire which has been previously extended downward in the side space portion and been inclined in a direction separating from the housing is fastened to the stud bolt.

However, at the time when the electric wire is fastened to the stud bolt, in the electric connection box, the electric wire may be deformed to approach the housing during a rotation movement of a nut caused by screwing the nut to the bolt in a state where the nut comes into contact with the terminal. Measures against the deformation have been desired. Furthermore, in the electric connection box, a gap is formed between the outer peripheral surface of the housing and the electric wire by fastening the electric wire which extends downward and is inclined to be separated from the housing to the stud bolt. Therefore, in order to prevent the liquid adhered to the electric connection box from entering the gap between the outer peripheral surface of the housing and the electric wire and adhering to the terminal of the electric wire and the like, it is desired to fill the gap.

SUMMARY OF THE INVENTION

The present invention has been made in view of the above. An object of the present invention is to provide an electric connection box and a wire harness capable of preventing an approach of an electric wire to a housing and improving waterproof property.

An electric connection box according to one aspect of the present invention includes a housing configured to include an internal space portion in which a plurality of electric components is housed; a side cover configured to be attached to an outer peripheral surface of the housing and have an inclined wall which extends downward and is formed to be inclined in a direction separating from the housing; a side space portion configured to be formed by the housing and the side cover; a fastening member configured to be provided in the internal space portion and be electrically connected to the plurality of electric components; and an electric wire configured to supply power from an outside of the housing to the plurality of electric components via the fastening member, wherein the electric wire includes: a terminal which is electrically connected to the fastening member, extends from the internal space portion toward the side space portion, is bent in the side space portion, and is formed to extend downward; and an electric wire main body of which a part including at least an end portion is positioned in the side space portion and of which the end portion is crimped to the terminal, the side space portion communicates with the outside of the housing through an opening formed in a lower side end portion, the electric wire main body is arranged along an inclined direction of the inclined wall in the side space portion and projects and extends from the side space portion to the outside of the housing through the opening in a state where the fastening member passes through a through-hole formed in the terminal, the housing includes a regulating portion positioned in the side space portion, and the regulating portion projects from the outer peripheral surface and is formed to extend along the inclined direction of the inclined wall.

A wire harness according to another aspect of the present invention includes an electric connection box configured to include a housing which includes an internal space portion in which a plurality of electric components is housed, a side cover which is attached to an outer peripheral surface of the housing and has an inclined wall which extends downward and is formed to be inclined in a direction separating from the housing, a side space portion which is formed by the housing and the side cover, and a fastening member which is provided in the internal space portion and is electrically connected to the plurality of electric components; and an electric wire configured to include a terminal which is electrically connected to the fastening member, extends from the internal space portion toward the side space portion, is bent in the side space portion, and is formed to extend downward and an electric wire main body of which a part including at least an end portion is positioned in the side space portion and of which the end portion is crimped to the terminal, and to supply power from an outside of the housing to the plurality of electric components via the fastening member, wherein the side space portion communicates with the outside of the housing through an opening formed in a lower side end portion, the electric wire main body is arranged along an inclined direction of the inclined wall in the side space portion and projects and extends from the side space portion to the outside of the housing through the opening in a state where the fastening member passes through a through-hole formed in the terminal, the housing includes a regulating portion positioned in the side space portion, and the regulating portion projects from the outer peripheral surface and is formed to extend along the inclined direction of the inclined wall.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of an electric connection box and a wire harness according to the present invention is described in detail below with reference to the drawings. The present invention is not limited to the following embodiment. Furthermore, components in the following embodiment include those at which a person skilled in the art can easily arrived or those substantially the same. In addition, various omissions, replacements, and changes can be made to the components in the embodiment without departing from the scope of the invention.

Embodiment

Figure 1:
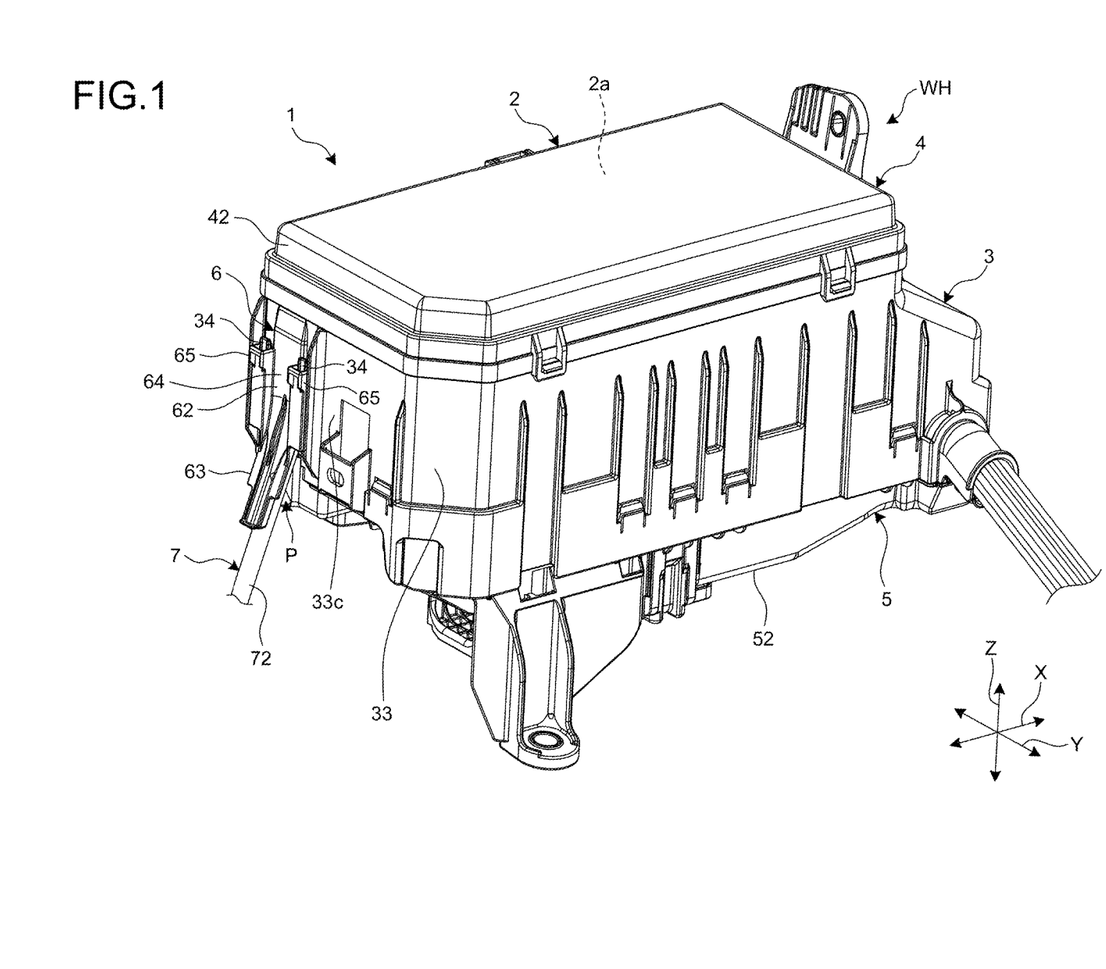
FIG. 1 is a perspective view of an electric connection box and a wire harness according to an embodiment.
Figure 2:
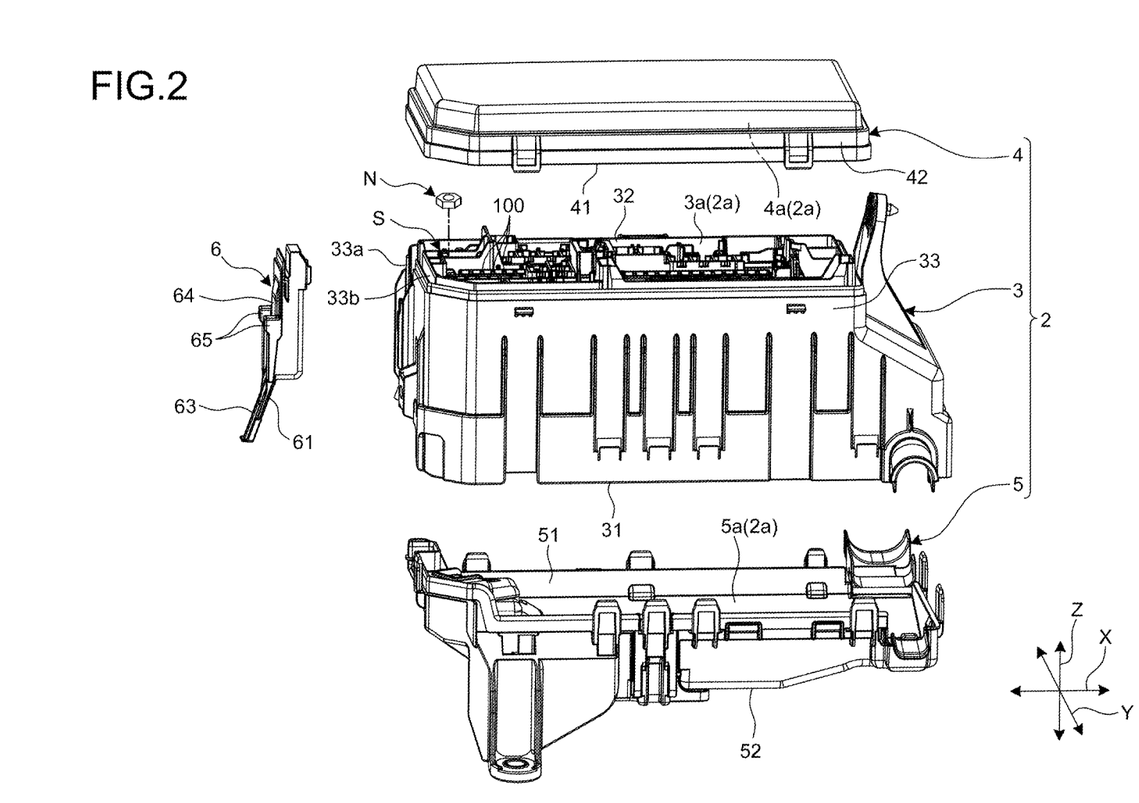
FIG. 2 is an exploded perspective view of the electric connection box and the wire harness according to the embodiment.
Figure 3:
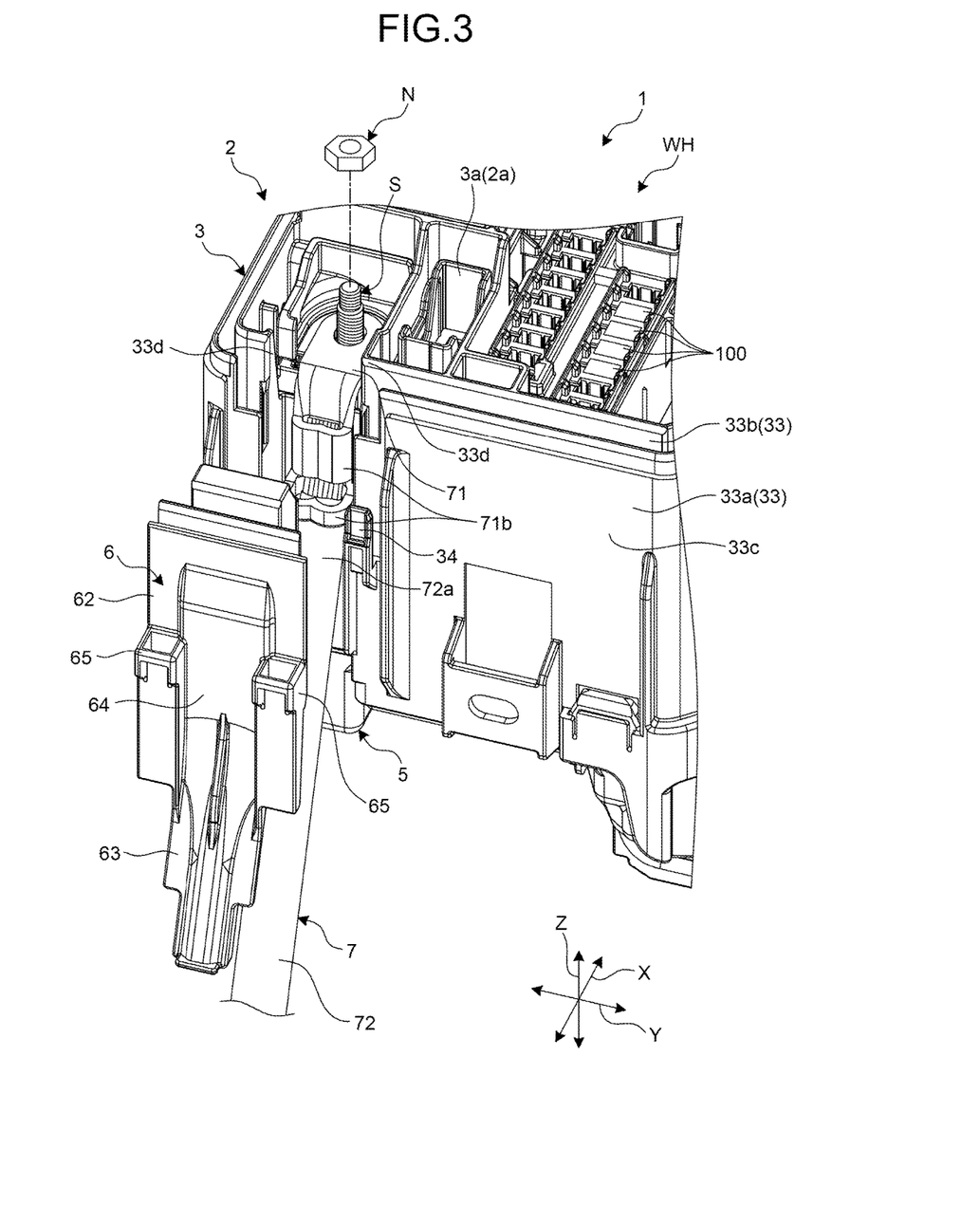
FIG. 3 is a partially enlarged view of the exploded perspective view of the electric connection box and the wire harness according to the embodiment.
Figure 4:
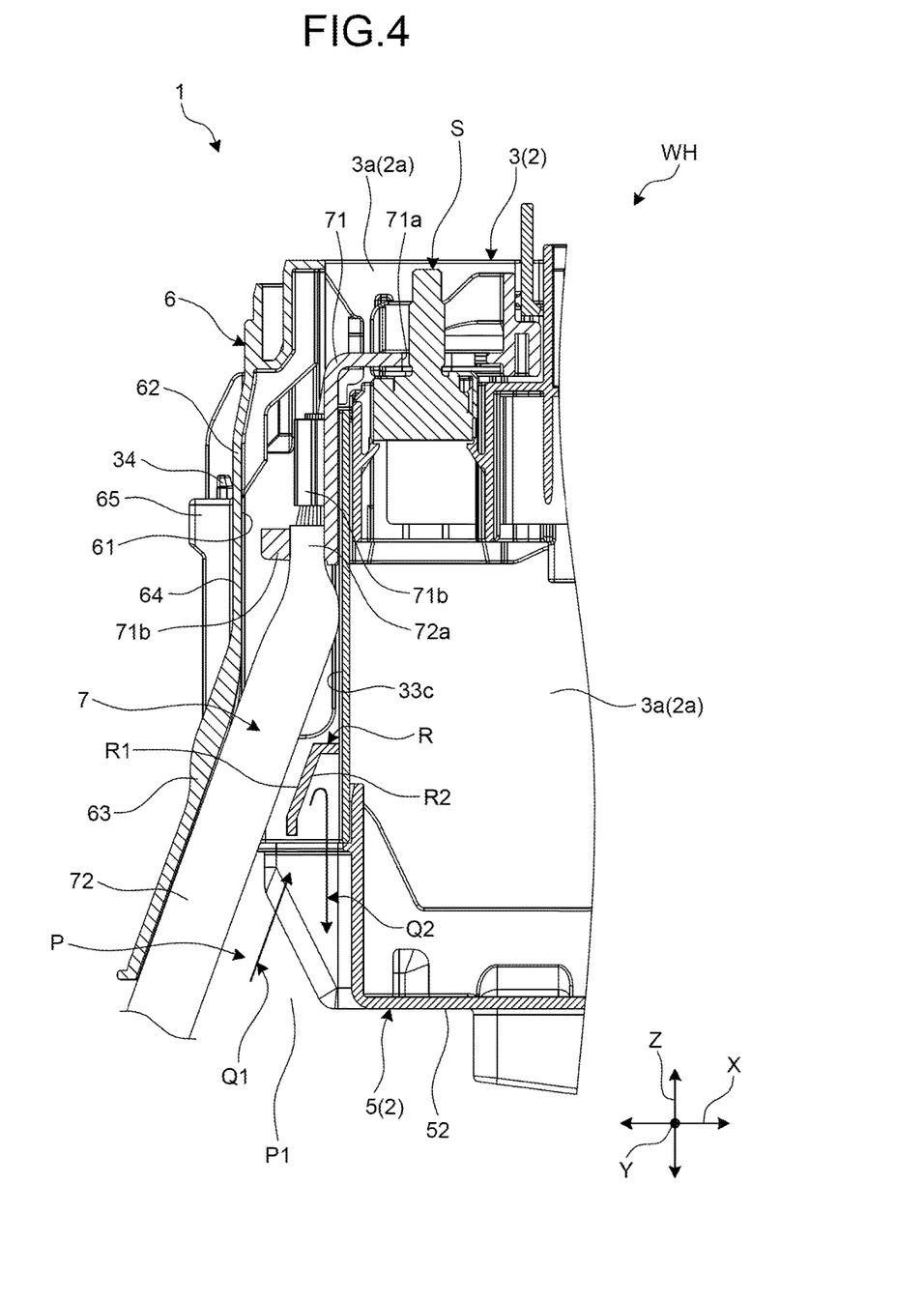
FIG. 4 is a partially enlarged view of a cross-sectional view of the electric connection box and the wire harness according to the embodiment.

First, an electric connection box and a wire harness according to an embodiment are described. FIG. 1 is a perspective view of the electric connection box and the wire harness according to the embodiment. FIG. 2 is an exploded perspective view of the electric connection box and the wire harness according to the embodiment. FIG. 3 is a partially enlarged view of the exploded perspective view of the electric connection box and the wire harness according to the embodiment. FIG. 4 is a partially enlarged view of a cross-sectional view of the electric connection box and the wire harness according to the embodiment. FIG. 2 is a view of a state where an electric wire is detached from the electric connection box. FIGS. 3 and 4 are views of a state where an upper cover is detached from the electric connection box. The X direction in each figure indicates the width direction of the electric connection box. The Y direction in each figure indicates the depth direction of the electric connection box and is perpendicular to the width direction. The Z direction in each figure indicates the height direction of the electric connection box, and is perpendicular to the width direction and the depth direction. Furthermore, the Z direction is the vertical direction.

An electric connection box 1 according to the present embodiment is mounted on a vehicle body of a vehicle such as an automobile and distributes power supplied from a power source such as a battery to various electric devices mounted on the vehicle body via various electric components and the like. As illustrated in FIGS. 1 to 3, the electric connection box 1 is incorporated in a wire harness WH and collectively houses electric components 100 such as a connector, a fuse, a relay, a branching part, an electronic control unit which configure components for connection processing such as an electric wire. The electric connection box 1 according to the present embodiment is provided in a place exposed to an external environment such as an engine room of the vehicle body and is connected between the power source such as the battery and the various electric devices mounted on the vehicle body. The electric connection box 1 is also referred to as a junction box, a fuse box, a relay box, or the like in some cases. However, in the present embodiment, these are collectively referred to as an electric connection box. As illustrated in FIGS. 1 to 4, the electric connection box 1 includes a box body 3, an upper cover 4, a lower cover 5 as a housing 2. Furthermore, the electric connection box 1 includes a fastening member S, a side cover 6, a side space portion P, an electric wire 7, and a regulating portion R.

The housing 2 houses the plurality of electric components 100 in an internal space portion 2a formed in the housing 2. The housing 2 is formed in a box shape and is formed of an insulating synthetic resin, and includes the box body 3, the upper cover 4, and the lower cover 5. The housing 2 is formed by stacking the lower cover 5, the box body 3, and the upper cover 4 in this order from the lower side. Each of the box body 3, the upper cover 4, and the lower cover 5 has locking mechanisms. By engaging the locking mechanisms with each other, the box body 3 and the upper cover 4 are locked to each other, and the box body 3 and the lower cover 5 are locked to each other. The housing 2 is attached to the vehicle body side in a state where the stacking direction of the lower cover 5, the box body 3, and the upper cover 4 coincides with the vertical direction. A vehicle body attaching part provided on the outer side of the housing 2 according to the present embodiment is brought into contact with a vehicle body side, for example, an attaching panel on the vehicle body side and the vehicle attaching part is fastened to the vehicle body side with a fastening member such as a bolt so that the housing 2 according to the present embodiment is provided in the vehicle body.

In a case where the electric connection box 1 is viewed from the vertical direction in a state where the electric connection box 1 is provided in the vehicle body side, the box body 3 is formed to have a substantially rectangular outer peripheral shape. The box body 3 has an internal space portion 3a. The internal space portion 3a forms a part of the internal space portion 2a of the housing 2. In the box body 3, a lower side opening 31 is formed in a lower end portion, and an upper side opening 32 is formed in an upper end portion. The box body 3 is formed in a hollow shape, and the lower side opening 31 communicates with the upper side opening 32 through the internal space portion 3a in the vertical direction. In the box body 3, a peripheral wall 33 forming the internal space portion 3a has a double wall structure including an outer wall 33a and an inner wall 33b. A gap is formed between the outer wall 33a and the inner wall 33b.

In the box body 3, the fastening member S is provided in the internal space portion 3a. In the box body 3, in a portion adjacent to the position where the fastening member S is provided, a part of the peripheral wall 33, that is, a part of the outer wall 33a and the inner wall 33b is cut along the depth direction. An outer peripheral surface 33c of the box body 3 is formed at a position recessed toward the internal space portion 3a, between both end portions 33d facing to each other in the depth direction, where the outer wall 33a and the inner wall 33b are cut. In the box body 3, at the both end portions 33d where the outer wall 33a and the inner wall 33b are cut, a gap between the outer wall 33a and the inner wall 33b at each end portion 33d is closed with the outer peripheral surface 33c which extends in the width direction and the vertical direction. That is, in the box body 3, as viewed from the vertical direction, one side of the outer peripheral surface 33c is opened and recessed toward the internal space portion 3a in a rectangular shape between the both end portions 33d facing to each other in the depth direction and in a part where the outer wall 33a and the inner wall 33b are cut. In the box body 3, locking portions 34 to lock the side cover 6 are respectively formed at the both end portions 33d of the outer wall 33a. In the locking portions 34, as viewed from the width direction and the depth direction, a locking plate projected from the outer peripheral surface 33c is formed to extend upward.

Here, the fastening member S according to the present embodiment is a stud bolt S. The stud bolt S electrically connects electric components outside (vehicle body side) the housing 2 with the electric components 100 housed in the internal space portion 2a. For example, to supply power to each electric component 100, the stud bolt S is electrically connected to a conductor such as a bus bar which is electrically connected to each electric component 100. For example, in a case where power is supplied from the power source on the vehicle body side, the power is transmitted at one position with the stud bolt S, and the power can be distributed and supplied to each electric component 100 via the stud bolt S. The stud bolt S is attached to an attaching member and the like for the stud bolt S coupled to an inner peripheral surface of the peripheral wall 33, and is provided in the internal space portion 3a, that is, the internal space portion 2a of the housing 2, in a state of being erected upward. The stud bolt S has a thread groove formed on the outer periphery thereof. After the stud bolt S is inserted into a terminal 71 of the electric wire 7 to be described later, a nut N is inserted and screwed to the stud bolt S to fasten the terminal 71.

The upper cover 4 closes the upper side opening 32 of the box body 3. As viewed from the vertical direction, the upper cover 4 is formed to have the same outer peripheral shape as the box body 3 (including substantially the same). The upper cover 4 has an internal space portion 4a. The internal space portion 4a forms a part of the internal space portion 2a of the housing 2. The upper cover 4 has a lower side opening 41 communicating with the internal space portion 4a of the upper cover 4, and is formed in a lid shape. The upper cover 4 has a peripheral wall 42, which forms the internal space portion 4a, having a double wall structure including an outer wall and an inner wall. In a state where the upper cover 4 is attached to the box body 3, the inner wall of the upper cover 4 is inserted into the gap between the outer wall 33a and the inner wall 33b of the box body 3, and the outer wall of the upper cover 4 is positioned outside the outer wall 33a of the box body 3. That is, in a state where the upper cover 4 is attached to the box body 3, the outer wall and the inner wall of the upper cover 4 and the outer wall 33a and the inner wall 33b of the box body 3 are alternately arranged outward of the housing 2 and form a waterproof structure.

The lower cover 5 closes the lower side opening 31 of the box body 3. As viewed from the vertical direction, the lower cover 5 is formed to have the same outer peripheral shape as the box body 3 (including substantially the same). The lower cover 5 has an internal space portion 5a. The internal space portion 5a forms a part of the internal space portion 2a of the housing 2. That is, the internal space portion 2a of the housing 2 includes the internal space portion 3a of the box body 3, the internal space portion 4a of the upper cover 4, and the internal space portion 5a of the lower cover 5. The lower cover 5 has an upper side opening 51 communicating with the internal space portion 5a of the lower cover 5, and is formed in a plate-like shape. A drain hole which is not shown is formed in a bottom portion 52 of the lower cover 5. To cope with a case where liquid enters the internal space portion 2a of the housing 2, the drain hole discharges the liquid which has moved to the bottom portion 52 through a drain path which is not shown formed in the housing 2 to the outside of the housing 2.

The side cover 6 is attached to the housing 2 and forms the side space portion P to be described later so as to suppress an application of a load from outside to the electric wire 7. The side cover 6 is attached to the outer peripheral surface 33c of the box body 3. The side cover 6 is attached so as to close a space, where the outer wall 33a and the inner wall 33b of the box body 3 are cut, between the both end portions 33d facing to each other in the depth direction along the depth direction. In a state where the side cover 6 is attached to the outer peripheral surface 33c, an inner surface 61 positioned on the side of the internal space portion 3a faces to the outer peripheral surface 33c between the both end portions 33d in the width direction. The side cover 6 is formed of an insulating synthetic resin. The side cover 6 has a main body portion 62 and an inclined wall 63.

The main body portion 62 is formed in a substantially rectangular shape as viewed from the width direction and the depth direction, and is formed to vertically extend along the downward direction. The main body portion 62 has locking portions 65, formed in a frame shape as viewed from the vertical direction, on the outer surface 64 facing to the inner surface 61. When the side cover 6 is attached to the box body 3, the locking portions 65 lock the side cover 6 to the box body 3 by inserting the locking portions 34 of the box body 3 into the locking portions 65 to engage the locking portions with each other.

The inclined wall 63 is formed to be inclined so as to regulate deformation of the electric wire 7 outward of the housing 2 and to secure a gap between the electric wire 7 and the housing 2. The inclined wall 63 is formed to project from the lower end portion of the main body portion 62. The main body portion 62 and the inclined wall 63 are continuously and integrally formed. The inclined wall 63 extends downward and is formed to be inclined in a direction separating from the box body 3. In a state where the side cover 6 is attached to the box body 3, as viewed from the depth direction, the lower end portion of the inclined wall 63 is positioned at the height equal to the bottom portion 52 of the lower cover 5, that is, the bottom portion of the housing 2 in the vertical direction.

The side space portion P is a space portion formed by the housing 2 and the side cover 6. The side space portion P is a space portion formed by the outer peripheral surface 33c of the box body 3 and the inner surface 61 of the side cover 6. The side space portion P is formed in a cylindrical shape along the vertical direction in a region formed by the main body portion 62 and the box body 3. The side space portion P is formed along an inclined direction of the inclined wall 63 in a region formed by the inclined wall 63 and the box body 3. That is, the side space portion P extends downward and is formed so that a cross-sectional area positioned on a plane formed in the width direction and the depth direction increases in a direction toward the outside of the housing 2. In the side space portion P, openings are formed in the upper side end portion and the lower side end portion. The opening on the upper side is closed by the upper cover 4. The side space portion P communicates with the outside of the housing 2 through the opening P1 on the lower side. The opening P1 in the lower side end portion of the side space portion P is an opening through which the electric wire 7 routed in the side space portion P projects to the outside. Furthermore, since the side space portion P is formed along the inclined direction of the inclined wall 63, an opening area of the opening P1 in the lower side end portion is larger than that of the opening in the upper side end portion.

The electric wire 7 supplies power to the plurality of electric components 100 from electric components outside the housing 2, such as a battery mounted on the vehicle body, via the stud bolt S. The electric wire 7 has the terminal 71 and an electric wire main body 72.

The terminal 71 according to the present embodiment is a metallic LA terminal. The terminal 71 is electrically connected to the stud bolt S. The terminal 71 is a plate-like member, and is formed to extend in a substantially rectangular shape having long sides. The terminal 71 has a through-hole 71a at one end portion in the extending direction. The through-hole 71a is a hole through which the stud bolt S passes. The terminal 71 has a crimping portion 71b on the other end portion side in the extending direction. Regarding the crimping portion 71b, both end portions in the direction perpendicular to the extending direction, that is, the short side direction project in the horizontal direction and is deformed to surround and hold the outer periphery of the electric wire main body 72 placed on the terminal 71. The terminal 71 is bent between the through-hole 71a and the crimping portion 71b in the extending direction. That is, in a state where the terminal 71 is fastened to the stud bolt S, the terminal 71 is formed to extend from the internal space portion 2a of the housing 2, where the stud bolt S is provided, toward the side space portion P, be bent in the side space portion P, and then, extend downward. In a state where the terminal 71 is fastened to the stud bolt S, the terminal 71 is bent as described above. Therefore, the surface on which the electric wire main body 72 is placed faces to the side cover 6.

The electric wire main body 72 has conductivity and electrically connects the power outside the housing 2, that is, the electric components such as the power source on the vehicle body side to the terminal 71. The electric wire main body 72 is formed by bundling a plurality of conducting wires and covering the outer periphery of the conducting wires in a bundled state with an insulator. A part of the electric wire main body 72 including at least an end portion 72a is positioned in the side space portion P. At the end portion 72a of the electric wire main body 72, the conducting wire is exposed to the outside of the insulator, and the terminal 71 is crimped to the conducting wire. In a state where the stud bolt S passes through the through-hole 71a formed in the terminal 71 crimped to the end portion 72a, the electric wire main body 72 is arranged along the inclined direction of the inclined wall 63 of the side cover 6 in the side space portion P. That is, as the electric wire main body 72 extends downward in the side space portion P, clearance between the electric wire main body 72 and the box body 3 increases. The electric wire main body 72 has contact with the inner surface 61 of the inclined wall 63. The electric wire main body 72 projects and extends from the side space portion P to the outside of the housing 2 through the opening P1 in the lower side end portion of the side space portion P.

The regulating portion R is formed at a position in the side space portion P in the housing 2. The regulating portion R is formed to project from the outer peripheral surface 33c of the box body 3 positioned in the side space portion P and extend along the inclined direction of the inclined wall 63. The regulating portion R is formed to project from the outer peripheral surface 33c, extend along the width direction toward the side of the side cover 6, be bent downward, and then, extend along the inclined direction of the inclined wall 63. The regulating portion R is integrally formed with the box body 3. The regulating portion R is positioned between the electric wire 7 and the housing 2 in the side space portion P. In the regulating portion R, an outer surface R1 positioned on the side of the side cover 6 faces to the electric wire 7 and substantially comes into contact with the electric wire main body 72. That is, the electric wire main body 72 comes into contact with the side cover 6 and the regulating portion R and is sandwiched between the side cover 6 and the regulating portion R. Furthermore, an inner surface R2 facing to the outer surface R1 faces to the outer peripheral surface 33c. The regulating portion R is formed in a rectangular shape having one side along the depth direction as viewed from the vertical direction, and is formed in a flat plate shape as viewed from the depth direction.

Next, an assembling procedure of the electric connection box 1 according to the present embodiment is described. First, a worker assembles electric wires which are not shown and a bus bar connected to the stud bolt S into a sub block housed in the internal space portion 3a of the box body 3 to form a sub harness. Next, the worker inserts the sub harness including the sub block into the internal space portion 3a from the lower side of the box body 3 and fixes the inserted sub block by engaging the sub block with a block attaching member of the box body 3 and the like. Next, the worker mounts the electric components 100 on each block from the upper side of the box body 3, and electrically connects the electric components 100 to the electric wire which is not shown. Next, the worker attaches the stud bolt S to an attaching member for the stud bolt S provided in the internal space portion 3a of the box body 3.

Next, the worker places the end portion 72a of the electric wire main body 72, of which the conducting wire is exposed by peeling a covering member, on the terminal 71. Next, the worker bends the terminal 71 at a substantially right angle between the through-hole 71a and the crimping portion 71b in the extending direction of the terminal 71 by using a jig. The bending direction of the terminal 71 is a direction in which the surface on which the electric wire main body 72 is placed faces to the side cover 6 in a state where the electric wire 7 is fastened to the stud bolt S. Next, the worker deforms the crimping portion 71b so as to surround the end portion 72a of the electric wire main body 72 by using a jig, and crimps the terminal 71 to the electric wire main body 72. Next, the worker applies an external force to the electric wire main body 72 in a direction in which the electric wire main body 72 separates from the surface of the terminal 71 on which the electric wire main body 72 has been placed with a crimping position with the terminal 71 as a fulcrum to deform the electric wire main body 72. By deforming the electric wire main body 72 in the direction in which the electric wire main body 72 separates from the terminal 71, the electric wire main body 72 is deformed to be inclined along the inclined direction of the inclined wall 63 in the side space portion P in a state where the stud bolt S passes through the through-hole 71*a* of the terminal 71 to be described later.

Next, the worker makes the stud bolt S pass through the through-hole 71*a* formed in the terminal 71. At this time, the electric wire main body 72 is positioned on the outer side of the housing 2 from the outer surface R1 of the regulating portion R. Next, the worker inserts the stud bolt S into a through-hole which has been formed in the nut N and has a thread groove in an inner peripheral surface thereof and rotates the nut N to screw the nut N to the stud bolt S. The worker continues to screw the nut N to the stud bolt S so that the nut N comes into contact with the terminal 71. In addition, when the worker rotates the nut N in a state where the nut N comes into contact with the terminal 71, depending of the electric wire 7, the electric wire main body 72 is likely to deform to approach the housing 2. Even if the electric wire main body 72 deforms to approach the housing 2, the electric wire main body 72 comes into contact with the outer surface R1 of the regulating portion R. Therefore, the approach of the electric wire main body 72 to the housing 2 is regulated. When the worker cannot screw the nut N to the stud bolt S any more, the nut N and the terminal 71 are both fastened to the stud bolt S.

Next, the worker attaches the side cover 6 to the outer peripheral surface 33*c* of the housing 2. The worker engages the locking portions 65 formed on the side cover 6 with the respective locking portions 34 formed on the outer peripheral surface 33*c* of the box body 3 and locks the side cover 6 to the box body 3. Next, the worker attaches the lower cover 5 to the lower side opening 31 of the box body 3, and attaches the upper cover 4 to the upper side opening 32 of the box body 3. With the above procedure, the assembly of the electric connection box 1 is completed. Then, the worker attaches the electric connection box 1 to the vehicle body side in a state where the lower cover 5 is provided on the lower side, brings the vehicle body attaching part provided outside the housing 2 into contact with the vehicle body side, and fastens the vehicle body attaching part to the vehicle body side with the fastening member such as a bolt.

Next, regarding the electric connection box 1 according to the present embodiment, a flow of liquid in a case where the liquid (for example, water used for cleaning) collides against the housing 2 from outside is described with reference to FIG. 4. Normally, when the liquid from the upper side collides with the housing 2, the liquid is prevented from entering the internal space portion 2*a* by a waterproof structure formed in the upper cover 4 and the box body 3. For example, in a state where the electric connection box 1 is attached to the vehicle body side, there is a case where the liquid from the lower side collides with the housing 2 and enters the side space portion P. The liquid which has entered the side space portion P moves upward between the housing 2 and the electric wire main body 72 (Q1). The liquid which has moved upward in the side space portion P collides with the inner surface R2 of the regulating portion R. The upward movement of the liquid is regulated by the inner surface R2, and the moving direction is changed to the downward direction (Q2). The liquid which has moved downward is discharged to the outside of the housing 2 from the opening P1 in the lower side end portion of the side space portion P.

As described above, in the electric connection box 1 according to the present embodiment, the side cover 6 and the housing 2 form the side space portion P. The side cover 6 has the inclined wall 63 which extends downward and is inclined in a direction separating from the housing 2. Therefore, the side space portion P extends downward and is formed to be expanded outward of the housing 2. The regulating portion R is formed to project from the outer peripheral surface 33*c* of the box body 3 positioned in the side space portion P and is formed to extend along the inclined direction of the inclined wall 63 in the side space portion P. Therefore, in the electric connection box 1, when the electric wire 7 is fastened to the stud bolt S, that is, in a state where the stud bolt S passes through the through-hole 71*a* of the terminal 71 and the nut N comes into contact with the terminal 71 and when the nut N is screwed to rotate, even if the electric wire main body 72 is deformed to approach the housing 2, the electric wire main body 72 comes into contact with the outer surface R1 of the regulating portion R. Therefore, the approach of the electric wire 7 to the housing 2 can be prevented. Furthermore, after the stud bolt S has been fastened to the nut N, for example, even in a case where the external force is applied to the electric wire main body 72 to approach to the housing 2 during an operation to attach the electric connection box 1 to the vehicle body side, the electric wire main body 72 comes into contact with the outer surface R1 of the regulating portion R. Therefore, the electric connection box 1 can prevent the approach of the electric wire 7 to the housing 2 by the regulating portion R.

Furthermore, in the electric connection box 1, a gap is formed between the housing 2 and the electric wire 7 by forming the electric wire main body 72 along the inclined direction of the inclined wall 63. In a case where liquid enters the gap, the regulating portion R is formed to extend along the inclined direction of the inclined wall 63 and fill the gap between the housing 2 and the electric wire 7 so that upward movement of the liquid is regulated by the inner surface R2 of the regulating portion R. Therefore, even in a case where the liquid enters the side space portion P, the liquid is prevented from adhering to the terminal 71 and entering the internal space portion 2*a*. That is, the electric connection box 1 has the waterproof structure between components forming the housing 2. In addition, the waterproof property of the electric connection box 1 can be improved because the regulating portion R to regulate the entrance of the liquid to the gap formed to route the electric wire 7 is formed, and for example, measures against the entrance of the liquid from the lower side are taken.

Since the wire harness WH described above includes the electric connection box 1, the wire harness WH can prevent the approach of the electric wire 7 to the housing 2 and improve the waterproof property.

An electric connection box and a wire harness according to the present embodiments can prevent an approach of an electric wire to a housing and improve waterproof property since a regulating portion is formed to project from an outer peripheral surface of the housing and extend along an inclined direction of an inclined wall of a side cover.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric connection box comprising:
a housing configured to include an internal space portion in which a plurality of electric components is housed;
a side cover configured to be attached to an outer peripheral surface of the housing and have an inclined wall which extends downward and is formed to be inclined in a direction separating from the housing;
a side space portion configured to be formed by the housing and the side cover;
a fastening member configured to be provided in the internal space portion and be electrically connected to the plurality of electric components; and
an electric wire configured to supply power from an outside of the housing to the plurality of electric components via the fastening member, wherein
the electric wire includes:
a terminal which is electrically connected to the fastening member, extends from the internal space portion toward the side space portion, is bent in the side space portion, and is formed to extend downward; and
an electric wire main body of which a part including at least an end portion is positioned in the side space portion and of which the end portion is crimped to the terminal,
the side space portion communicates with the outside of the housing through an opening formed in a lower side end portion,
the electric wire main body is arranged along an inclined direction of the inclined wall in the side space portion and projects and extends from the side space portion to the outside of the housing through the opening in a state where the fastening member passes through a through-hole formed in the terminal,
the housing includes a regulating portion positioned in the side space portion, and
the regulating portion projects from the outer peripheral surface and is formed to extend along the inclined direction of the inclined wall.

2. A wire harness comprising:
an electric connection box configured to include a housing which includes an internal space portion in which a plurality of electric components is housed, a side cover which is attached to an outer peripheral surface of the housing and has an inclined wall which extends downward and is formed to be inclined in a direction separating from the housing, a side space portion which is formed by the housing and the side cover, and a fastening member which is provided in the internal space portion and is electrically connected to the plurality of electric components; and
an electric wire configured to include a terminal which is electrically connected to the fastening member, extends from the internal space portion toward the side space portion, is bent in the side space portion, and is formed to extend downward and an electric wire main body of which a part including at least an end portion is positioned in the side space portion and of which the end portion is crimped to the terminal, and to supply power from an outside of the housing to the plurality of electric components via the fastening member, wherein
the side space portion communicates with the outside of the housing through an opening formed in a lower side end portion,
the electric wire main body is arranged along an inclined direction of the inclined wall in the side space portion and projects and extends from the side space portion to the outside of the housing through the opening in a state where the fastening member passes through a through-hole formed in the terminal,
the housing includes a regulating portion positioned in the side space portion, and
the regulating portion projects from the outer peripheral surface and is formed to extend along the inclined direction of the inclined wall.

* * * * *